United States Patent [19]

Kane et al.

[11] 4,419,384

[45] Dec. 6, 1983

[54] APPARATUS AND PROCESS FOR ULTRASONICALLY IDENTIFYING AND COATING ARTICLES HAVING DIFFERING CHARACTERISTICS

[75] Inventors: John F. Kane; Kerry L. Weinhold, both of Lancaster, Pa.

[73] Assignee: Armstrong World Industries, Inc., Lancaster, Pa.

[21] Appl. No.: 423,664

[22] Filed: Sep. 27, 1982

[51] Int. Cl.³ .............................................. B05D 3/12
[52] U.S. Cl. ..................................... 427/57; 118/323; 118/324; 118/669; 118/697; 118/698; 427/421
[58] Field of Search .................. 427/57, 421; 118/323, 118/324, 669, 697, 698

*Primary Examiner*—Bernard D. Pianalto

[57] ABSTRACT

Disclosed is an apparatus and process for ultrasonically identifying and coating articles having differing dimensional characteristics wherein, a series of such articles are moved in a random sequence past a predetermined point where the presence of each article is electronically sensed. At least two ultrasonic wave transmitters located at known distances from this point impinge waves on each article when it arrives at said point. One of the wave transmitters is positioned above the article. Waves reflected from the articles are received by ultrasonic receivers and are compared to and matched with similar code-number-identified wave patterns contained in a computer data base to identify each article's dimensional characteristics and select a predetermined control sequence program for a means for coating the articles. The matching code-number-identified signal selected from the data base is then transmitted to a pre-programmed coating means which applies a customized coating to the article according to its predetermined dimensional characteristics.

2 Claims, 1 Drawing Figure

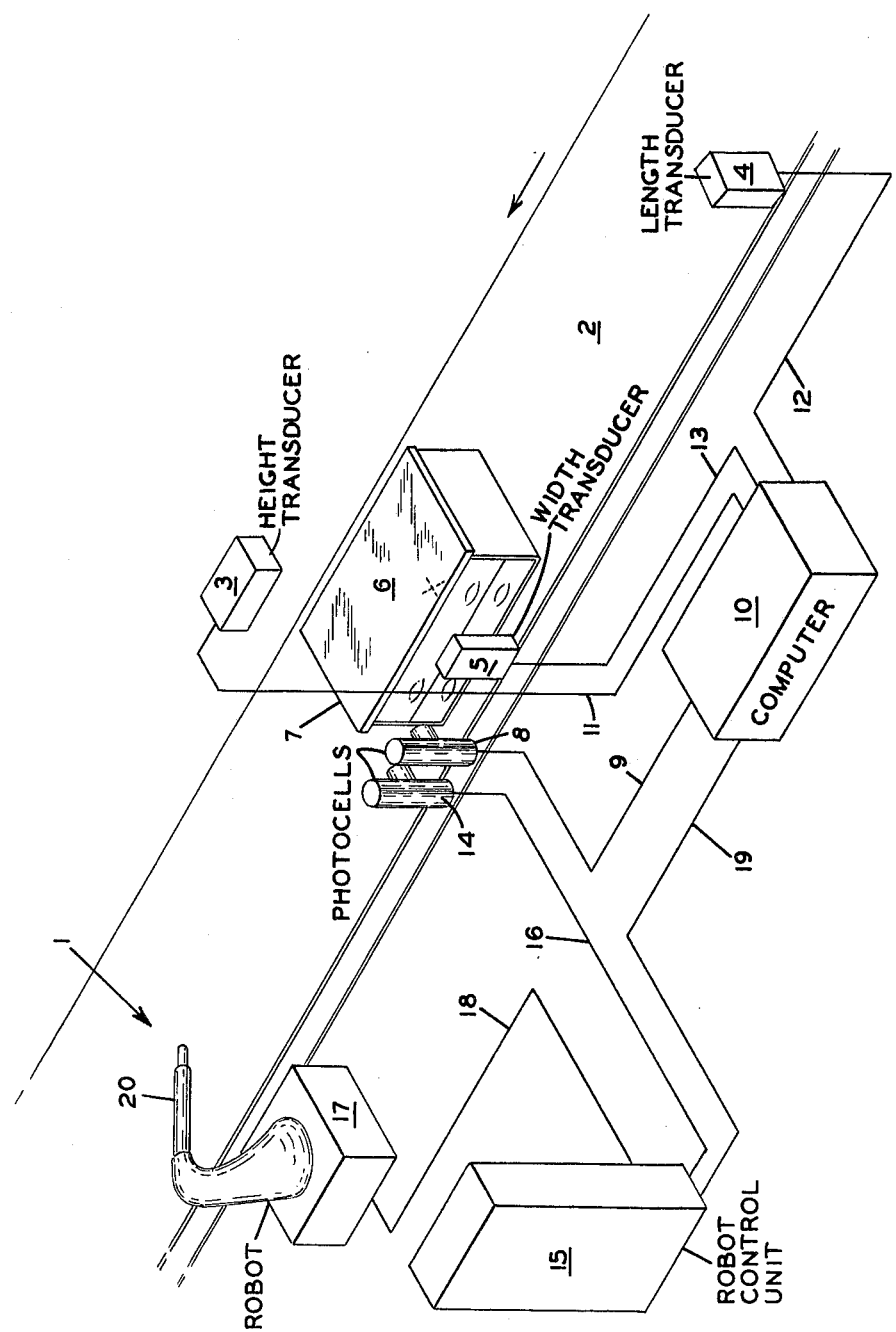

APPARATUS AND PROCESS FOR ULTRASONICALLY IDENTIFYING AND COATING ARTICLES HAVING DIFFERING CHARACTERISTICS

BACKGROUND OF THE INVENTION

1. Field of the Invention

This invention relates generally to an apparatus and process for ultrasonically identifying and coating articles having differing dimensional characteristics. More specifically, the invention relates to such a process and apparatus wherein articles carried on a conveyor are ultrasonically identified by their dimensions and the resulting information is used to electronically select and initiate an appropriate coating operation by a pre-programmed coating apparatus.

2. Description of the Prior Art

In the past, two methods have been used to select coating programs for robots: manual entry and multiple photocells connected to a programmable controller.

The manual entry task is assigned to an operator at some point preceding the automatic operation. Process codes for all items between this point and the robot must be held in a queue. Errors such as entry of incorrect codes, or mistakes in sequence, both, could result in damage to the equipment or goods. Sequence errors could require considerable down time for re-entry of the queued data.

Systems using photocells and programmable controllers require a unique combination of bright and dark cells for each item. The hardware costs and installation time for these systems can exceed those of the coating system. Adding a single item could require additional photocells and complete retesting of the operation. For example, when articles of furniture are to be coated, the furniture dimensions may vary in a matter of inches or fractions thereof. Using the photocell system would require a prohibitive number of photocells and a rearrangement thereof whenever different articles were to be coated. Thus, the use of photocells would not provide a satisfactorily usable substitute for the apparatus and process of this invention. The diversity of furniture sizes requires a continuous measurement of dimensions, not the greater or smaller indication of a photocell arrangement. Safety features, such as detecting unknown items, add to the hardware costs and depend on the designer's ability to anticipate the characteristics of these items.

Ultrasonic range finding systems are known. Such systems are utilized in connection with the focusing apparatus of cameras and the like, as exemplified by U.S. Pat. Nos. 3,522,764 and 4,199,246. It is further known, as shown by U.S. Pat. No. 4,223,790 to convey articles to a location where their presence is sensed by a photocell arrangement and an electrical signal is generated which, in turn, actuates an ultrasonic wave generator. The ultrasonic waves impinged on an object of the conveyor are reflected, and the waves, which have been modulated by the object at its inherent vibration are received and converted into an electrical signal. The signal is then compared with a stored reference signal to discriminate whether the object is good or bad. An electrical signal is then fed through a drive circuit to a rotary solenoid which appropriately rotates an arm which, either removes the object from the conveyor, or leaves it thereon.

U.S. Pat. No. 3,149,561 relates to a supersonic article locating device that simultaneously checks the indirect dual supersonic reflections of the object together with the change of the reflected signal strength due to a change in its topography. These signals then initiate an operational control of a device which is moved to perform some work on the articles when they are in the proper location.

The known prior art does not teach any apparatus and process capable of applying a customized coating to each of a random series of articles of differing dimensional characteristics by utilizing ultrasonic identifying and control means for the coating means.

SUMMARY OF THE INVENTION

The present invention provides an apparatus and process for ultrasonically identifying and custom coating articles having varying and differing dimensional characteristics. In the invention, a computer data base is provided. The data base, if desired, may be generated by moving a series of articles having known characteristics on a conveyor, electronically detecting each article when it arrives at a specific location and, impinging ultrasonic waves on the article from transducers spaced at predetermined known distances from the point where the article was detected, one of the transducers being positioned above the article. Means are provided for receiving, storing, and code-identifying by number the ultrasonic wave patterns reflected from the articles having known dimensional characteristics, and for comparing and matching ultrasonic wave patterns reflected from articles subsequently conveyed past the detection point, with the numerically code-identified wave patterns previously obtained. The code number of each identified article is then electronically transmitted to a numerically-controlled pre-programmed coating means which appropriately coats each article.

It is the primary object of the invention to provide a process and apparatus for ultrasonically identifying and custom coating each of a series of articles having differing and variable dimensional characteristics. It is a further object of the invention to accomplish this by providing or generating a data-base comprising stored and code-number-identified ultrasonic wave patterns corresponding to those reflected from subsequent articles to be coated. A still further object of the invention is to use the data base for comparing and matching the reflected ultrasonic waves from articles subsequently encountered by the ultrasonic waves, with those in the data base. Another object of the invention is to numerically code-identify the matched wave patterns and electronically transmit the code number to a pre-programmed coating device for applying a customized coating to each article. This invention solves the problems of the prior art by providing an apparatus and process capable of continuously ultrasonically measuring and identifying each of a series of articles arranged in a random fashion and having differing and varying dimensional characteristics, code-number-identifying the reflected wave patterns from the articles and utilizing them to select a predetermined control sequence for a means for appropriately coating the articles when they are delivered to a work station.

BRIEF DESCRIPTION OF THE FIGURE

The single FIGURE of the drawing is a diagrammatical illustration of the arrangement of the components of the apparatus of this invention.

DESCRIPTION OF THE PREFERRED EMBODIMENT

The ultrasonic transmitting and receiving means, the microcomputer, and the automatic spray painting means used in this invention are all commercial items, and do not per se, form a part of the invention.

The ultrasonic transmitting and receiving means is a Polaroid Ultrasonic Ranging Unit, sold by Polaroid Corporation, Ultrasonic Ranging Marketing, Cambridge, MA.

Generally described, the Polaroid Ultrasonic Ranging unit comprises two primary components; they are, an acoustical transducer and an ultrasonic circuit board. Together these components are capable of detecting the presence and distance of objects within a range of about 0.9 feet to 35 feet.

In operation, a pulse is transmitted toward a target and the resulting echo is detected. The elapsed time between initial transmission and echo detection can then be converted to distance with respect to the speed of sound.

The principle component of the device is the transducer which transmits the outgoing signal and also functions as an electrostatic microphone in order to receive a reflected signal.

The ultrasonic circuit board electronics control the operating load (transmit/receive) of the transducer. It is comprised of three major sections which control transducer operation and allow the information gathered by it to be used as desired. The sections are: a digital circuit including a crystal-controlled clock which generates the ultrasonic frequencies that comprise the pulse transmitted by the transducer, an analog circuit, and a power section.

After generating the "chirp" or pulse, the operating mode of the transducer changes; in effect; from loudspeaker to microphone to detect the returning echo. Upon receiving the echo, the transducer converts the sound energy to electrical energy which is amplified by the analog circuit. It is then detected by the digital circuit to produce the echo-received signal.

The microcomputer used in this invention is the Rockwell AIM 65 sold by Rockwell International Corp.

The automatic spray painting robot used in this invention is Trallfa Robot sold by the DeVilbiss Co., Toledo, Ohio. The Trallfa consists of three elements: the manipulator or arm which is capable of duplicating human painting flexibility for spray painting, the control center which is a control module which can be "taught" a spray program to be used for parts to subsequently be coated; and a hydraulic power unit for operation of the robot.

Referring to the drawing, a general description of the operation of the apparatus is as follows: the means for moving a series of articles past a predetermined point x comprises a conveyor 2 which is driven by a conventional drive means (not shown) toward work station 1. The predetermined point x is preferably located directly beneath an ultrasonic transducer 3 positioned a known distance above the top surface of the conveyor 2, and is used to indicate the height of an article passing thereunder. The second transducer 4 is positioned to one side of the conveyor 2 and is appropriately angled so that it functions to indicate the length of an article when it is at the point x. A third transducer 5 may be positioned as shown in a horizontal plane perpendicular to the conveyor and would function to indicate the depth or width of an article at the point x.

As an article 6 to be coated is carried toward the work station 1 by the conveyor 2, the front 7 of the article 6 passes the first photocell 8 which is electronically connected by line 9 to the microcomputer 10. The microcomputer 10 is electronically connected by line 11 to the height transducer 3, by line 12 to the length transducer 4, and by the line 13 to the width transducer 5. When the article 6 is sensed by photocell 8, the height transducer 3 is turned on by the computer 10 through line 11 and the height measurement is made. If the measured value obtained is less than the distance from the height transducer 3 to the surface of the conveyor 2, this indicates to the computer 10 that an article is approaching the work station 1 and the full measuring routine is started. After the height of the article 6 has been measured, the computer 10 electronically switches on the transducer 4 to measure the length of the article 6. The computer 10 then switches on the transducer 5 to measure the width of the article 6. The article 6, moving on the conveyor toward the work station 1 is next detected by photocell 14 which is electronically connected to the robot control unit 15 by line 16 which in turn is electronically connected to the robot 17 through line 18 and to the computer 10 through line 19. Sensing of the article 6 by the photocell 14 sets into operation the program for the pre-programmed robot 17 which then applies the appropriate coating to the article 6 when it arrives at the work station 1 according to instructions fed by the computer 10 through line 19 to the robot control unit 15.

One of the features of the present invention is the ability to generate a data base for the computer by recording ultrasonic wave patterns reflected from each of a selected group of articles representative of those to be subsequently conveyed through the apparatus to the work station where they are coated. The recording program is a unique feature of the system in that it allows the operator to "program" the identification system at the same time, and using the same methods, used to "program" the robot. No other system that the inventors are aware of allows automatic entry of new item identifications.

The operation and functions of this system and its components will now be described with regard to the generation of the data base for the computer 10 and the identification recording of the robot control unit 15.

First, there are two types of memory in the AIM 65 microcomputer: "read only" and "read write" memory. The program is stored in the "read only" memory and cannot be changed except by replacing it with new circuits. The data base and measurements are stored in the "read write" memory which can be changed by the computer. Data stored in the "read write" memory is not retained when the power is turned off. When power is turned on, the values stored in this memory are unpredictable. The first task of the program is to store beginning values in the "read write" memory. One value will tell later parts of the program that no information is stored in the data base. The program must also set some electronic latches and switches that connect the microcomputer 10 to the robot control unit 15, the photocell 14, and the ultrasonic transducers 3, 4, and 5.

The robot control unit 15 combines the computer robot control (CRC) memory with a dual floppy disk memory system and an LED display. The CRC system allows 64 programs to be stored in the disk memory for recall in 0.5 second, making it ideal for painting parts loaded randomly on a conveyor. The robot may be programmed in a known manner to exactly duplicate the human motions of painting.

In generating the data base, when a new group of items is started, there will be of course, no previous data for the data base. The operator first selects the record mode for the robot and the identification system. (This could be a common control switch.) The operator also sets a program number on the thumb wheel switches on the robot control panel. The identification program could also read the switches directly. One of the weak points of the current robot unit is remembering the item that each program coats. The list must be kept on a separate medium. The data base on the identification system allows additional information to be stored. The AIM 65 microcomputer 10 has a 20 character display and key board that can be used to enter any data. The recording program will display a message that asks the operator to enter descriptive data for the item to be coated; this probably would include the item's identification number. When this data has been entered, the system is ready to record the coating program.

The item to be coated is placed on the conveyor 2 and started toward the work station 1. When the photocell 8 detects the presence of the item at the predetermined point x on the conveyor, a measurement is made with the height transducer 3 and the distance is compared to the distance to the conveyor. If the measured value is equal to this distance, no item is approaching the booth, when a smaller distance is measured, there is an item approaching and the full measuring routine is started and proceeds as previously described herein.

Many items could be identified by height measurements alone. Most furniture items have large, flat tops which are ideal for the ultrasonic system. It is not necessary to measure the maximum volume to make the identification, the system only requires that the measurements produce a unique combination. If one side of the item is open, or if there is no surface that intersects the beam (the measurement will be 35 feet). The three measurements will probably still be a unique combination. The measurements are stored and the photocell is checked to see if the item has arrived at this point. The height and width measurements will be fairly constant, but the length measurement will change as the item moves down the conveyor. The photocell provides a reference point that determines the actual length of the item. The computer saves the final values as the measurements of this item.

Since this will be the first item in the data base, the computer 10 stores a program number from the thumb wheel switches on the central panel of the robot control unit 15, the measured values, and any additional identification information in the memory, and the item continues on to the work station 1. When it arrives at the robot photocell 14, the robot control unit 15 begins recording all the movements of the operator as he coats the item. The operator stops the recording by releasing a trigger on the recording handle that is attached to the robot arm 20. The system has now been programmed to coat the first item.

Before recording the next item, the operator selects a new program number on the thumb wheel switches on the central panel of the robot control unit 15. The identification program will again prompt for identification information, and will prepare for the new item. The recording procedure is as previously described. When the final measured values are determined, the program will compare the new item to the previous item to verify that the measurements are unique. If they are not, the computer will display an error message to the operator. The procedure is repeated for the remaining items in the new group.

The information in the data base can be recorded on an output device such as cassette tapes, but any other device could be used. In advanced applications, the data could be transmitted to a central computer. To add new items to a previously recorded group, the recorded data is read into the computer memory before the recording procedure is started. Reading recorded data is called "loading".

When coating programs for all items have been recorded, the system is ready for operation. The operator moves the control switch from record mode to automatic mode. The identification program uses the same logic to measure the items arriving on the conveyor. When the item arrives at the photocell 8, the measured values are compared to those stored in the data base and the identification is made. If the measured values do not match a recorded item, a program number of zero is sent to the robot. The robot will allow this item to pass without coating it. This provides a great margin of safety for the robot and the item. The connections between the robot and the computer are standard digital connections.

What is claimed is:

1. A process utilizing ultrasonic identifying and control means, for coating articles having differing dimensional characteristics comprising:
   (a) providing a means for moving a series of said articles past a predetermined point to work station;
   (b) detecting the presence of each article when it reaches said predetermined point;
   (c) generating ultrasonic waves from at least two transducers and impinging the waves on each article at said predetermined point to obtain reflected wave patterns from each article thereby to identify its dimensional characteristics;
   (d) electronically comparing and matching the reflected wave patterns with similar numerically code-identified wave patterns in a data base to select a predetermined control sequence program for operating a numerically controlled pre-programmed means for coating each of said articles in accordance with its dimensional characteristics; and
   (e) electronically transmitting the identifying code numbers to the coating means to cause coating to be appropriately applied to each article when it arrives at the work station.

2. An apparatus utilizing ultrasonic identifying and control means, for coating articles having differing dimensional characteristics comprising:
   (a) means for moving a series of said articles past a predetermined point;
   (b) means for detecting the presence of each article when it reaches said point, and activating a means for identifying the dimensional characteristics of the article;
   (c) means operably connected to said detecting means for generating and impinging ultrasonic waves on each article when it is present at said predetermined point, to obtain reflected wave patterns from said article, thereby to identify its dimensional characteristics;

(d) means for identifying each of a series of articles moved past the predetermined point, said means including a data base containing code-number-identified wave patterns corresponding to those produced by said articles;

(e) said means of subparagraph (d) further including means for electronically comparing and matching the reflected wave patterns from each article as it reaches said predetermined point with similar wave patterns in the data base and selecting a predetermined control sequence program for operating a means for coating the articles, said control sequence program selected being identified by a code number;

(f) a numerically controlled, pre-programmed coating means located at said work station and adapted to respond to code numbers electronically transmitted thereto and to apply coating to each article in accordance with its dimensional characteristics; and (g) means for electronically transmitting the identifying code numbers to the coating means.

* * * * *